United States Patent [19]

Bockelmann et al.

[11] 4,122,806
[45] Oct. 31, 1978

[54] VALVE FOR ADDING EXTRA AIR IN AN INTERNAL COMBUSTION ENGINE

[75] Inventors: Wilfried Bockelmann, Kaarst; Rainer Steinbrink, Wuppertal, both of Germany

[73] Assignee: Deutsche Vergaser GmbH & Co. Kg, Neuss, Germany

[21] Appl. No.: 776,417

[22] Filed: Mar. 10, 1977

[30] Foreign Application Priority Data

Mar. 26, 1976 [DE] Fed. Rep. of Germany ....... 2612951

[51] Int. Cl.² .............................................. F02D 11/08
[52] U.S. Cl. ......................... 123/103 R; 123/119 DB; 123/124 R; 261/DIG. 19
[58] Field of Search ............. 123/97 B, 103 R, 119 D, 123/119 DB, 124 R, 124 A, DIG. 11; 137/480; 261/DIG. 19, 39 A

[56] References Cited

U.S. PATENT DOCUMENTS

| 2,969,800 | 1/1961 | Skirvin | 261/DIG. 19 |
|---|---|---|---|
| 3,698,371 | 10/1972 | Mitsuyama | 123/124 R |
| 3,752,131 | 8/1973 | Tsumura | 123/97 B |
| 3,852,391 | 12/1974 | Hisatomi | 261/DIG. 19 |
| 3,866,583 | 2/1975 | Pundt | 123/124 R |
| 3,987,131 | 10/1976 | Hisatomi | 261/39 A |
| 3,996,904 | 12/1976 | Kobuki | 123/103 R |

FOREIGN PATENT DOCUMENTS

| 994,978 | 11/1951 | France | 123/124 R |
|---|---|---|---|
| 519,242 | 3/1940 | United Kingdom | 123/124 R |

*Primary Examiner*—Charles J. Myhre
*Assistant Examiner*—Craig R. Feinberg
*Attorney, Agent, or Firm*—Haseltine, Lake & Waters

[57] ABSTRACT

A valve arrangement for adding air to the intake line of an internal combustion engine, particularly Otto-cycle engines, during the deceleration of the engine. A diaphragm which is controlled by intake pipe pressure, acts against the force of a spring and is located within a dosing or metering unit so as to divide the unit into two chambers. The diaphragm actuates the valve via a rod, and the two chambers are connected through a calibration and a check valve. The upper chamber can be vented through a bore or opening by means of a second diaphragm which is controlled by the intake pipe pressure and acts against the force of a spring. A barometer bellows determines the preload of the spring through a disc and a rod.

4 Claims, 1 Drawing Figure

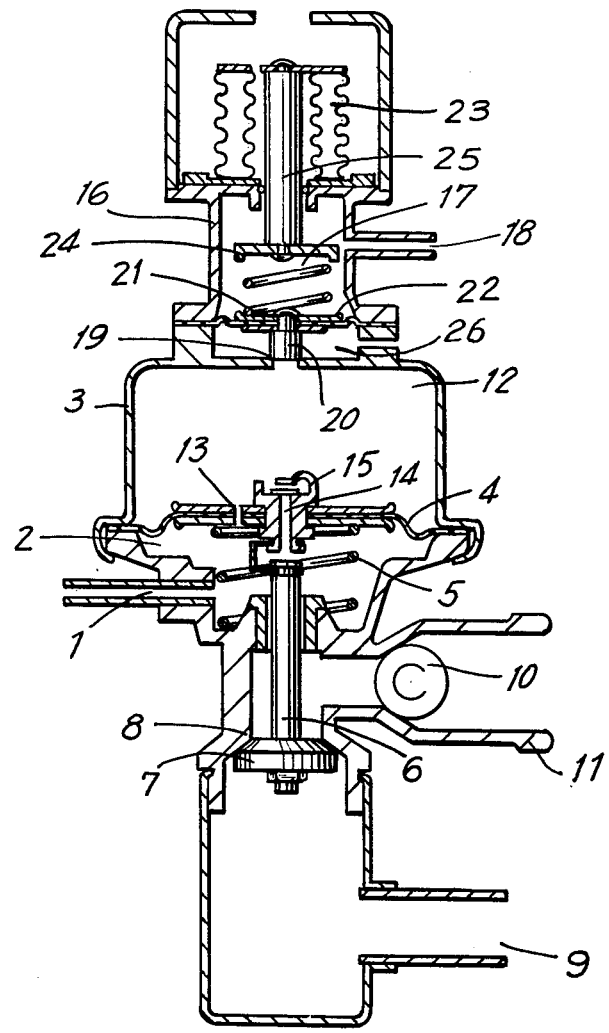

VALVE FOR ADDING EXTRA AIR IN AN INTERNAL COMBUSTION ENGINE

BACKGROUND OF THE INVENTION

The present invention relates to a valve for adding air to the intake line of an internal combustion engine, particularly Otto-cycle engines, during the deceleration phase with a diaphragm which is controlled by intake pipe pressure, acts against the force of a spring and is located in a can or metering member dividing it into two chambers. The diaphragm actuates a valve via a rod, and the chambers are connected via a calibration and a check valve.

The purpose of such an arrangement is the reduction, during deceleration, of the fuel deposited on the intake pipe walls and the prevention of peak values in the emission of CH and CO by making the mixture leaner by means of the added air.

The disadvantages of this known valve is that in deceleration there is only a brief addition of air which effects the required "leaning" of the mixture that is sufficient for normal driving operation. With longer deceleration phases, after the valve is closed, which takes place after the pressure is equalized via the calibration located between the chambers, there is an increase of the emission values by evaporating of more fuel deposited on the intake pipe walls. With maintained deceleration and by lowering the intake pipe pressure when the extra-air valve is closed again, at higher rpm's the underpressure limit can be exceeded; as a result, the incombustible mixture passes through the cylinders into the exhaust system and there leads, at an afterburner, to thermal damage through overheating.

It is, therefore, an object of the present invention to provide a valve for the addition of extra air for longer deceleration phases, such as downhill runs, where the appearance of emission peak values by evaporation of fuel deposited on the intake pipe walls is avoided, and a sufficient amount of air is available for a proper combustion in the cylinder.

Another object of the present invention is to provide an arrangement which is simple in construction and may be economically fabricated.

A further object of the present invention is to provide an arrangement, of the foregoing character, which has a substantially long operating life and may be readily and economically maintained in service.

SUMMARY OF THE INVENTION

These objects of the present invention are achieved by providing that the upper chamber of the siphon diaphragm can be vented to the atmosphere by means of a second diaphragm which is controlled by intake pipe pressure, acts against the force of a spring, and is located in a cylindrical can (dosing member) via a drillhole.

The advantages achieved by the present invention are that a small reduction of the intake pipe pressure leads to a brief addition of extra air, and as a result exhaust detonation (backfire) and an increase of CH emission are prevented.

A great reduction of the intake pipe pressure results in a steady addition of extra air, preventing, besides long-term exhaust detonation, the overheating of the afterburner, since the underpressure limit is shifted to higher motor speeds or rpm's by increasing the intake pipe pressure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

A sectional elevational view showing an embodiment in accordance with the present invention.

DESCRIPTION OF THE PREFERRED EMBODIMENT

The control pressure, that is the suction pipe pressure, is transmitted through the line 1 to the chamber 2 of a siphon diaphragm 3. When the intake pipe pressure drops below a preset amount, a diaphragm 4 is pulled against the force of a spring 5. Via a rod 6 connected to the diaphragm 4, a valve disc 7 is lifted from its seat 8 so that additional air is supplied, via connection 9 and the check valve 10, to the connection 11 leading to the intake pipe (not shown). The bottom chamber 2 of the siphon diaphragm 3 is in continuous communication with the upper chamber 12 via a calibration 13 so that pressure equalization takes place between them. If the opening force of the pressure difference between the chambers 2 and 12 is smaller than the closing force of spring 5, the valve 7, 8 is closed. If the pressure in chamber 2 is greater than in chamber 12, the pressure is equalized quickly via drillhole 14 and check valve 15 and valve 7, 8 closes. If the intake pipe pressure drops extremely, the upper chamber 12 is vented to the atmosphere by means of a valve cone (poppet) 20 which allows access to drillhole 19. This takes place via a second siphon diaphragm 16; the valve cone is moved by a diaphragm 22 acting against the force of a spring 21. Since the calibration 13 is small in comparison to the drillhole 19, there is virtually no pressure equalization between chambers 2 and 12 and valve 7, 8 remains open. With increasing intake pipe pressure, the drillhole 19 is closed and the valve 7, 8 closes when the pressure in chambers 2 and 12 is equalized. Line 18 connects the suction pipe with the chamber 17.

With low air pressure at high altitudes, the intake pipe pressure acting in space 17 against the force of a spring decreases. In order to achieve the desired shift of the underpressure limit under these conditions, the preload of the spring 21 is determined via a barometer bellows 23 by a disc 24 and a rod 25. Since the diaphragm 22 on the one side is under intake pipe pressure and on the other under atmospheric pressure, the operating point of valve 19, 20 is shifted in such a way, that with decreasing atmospheric pressure, the venting effect takes place at lower intake pipe pressure.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalents of the following claims.

What is claimed is:

1. A valve arrangement for adding air to the intake line of an internal combustion engine, particularly Otto-cycle engines during the deceleration phase, comprising: a first diagram controlled by via an intake pipe intake pipe pressure; dosing means 3 holding said first diaphragm, said first diaphragm dividing said dosing means into first and second chambers comprising, respectively, a control pressure chamber connected via a line with the intake pipe and a reference pressure chamber; first spring means acting against said first diaphragm; a valve and a rod actuated by said first diaphragm; a calibration and a check valve connecting said first and second chambers; second dosing means comprising second spring means acting against a second diaphragm dividing said second dosing means into third and fourth chambers; the third chamber being connected via a second line with the intake pipe; said second diaphragm being controlled by intake pipe pressure; the fourth chamber being open to atmosphere and connectable via bore means with said reference pressure chamber; said second diaphragm actuating a valve disc against the force of said second spring means for venting said reference pressure chamber.

2. The valve arrangement as defined in claim 1 wherein said reference pressure chamber is vented to the atmosphere through said valve disc, said valve disc providing access to said bore means when intake pipe pressure drops extremely, said valve disc being displaced by said second diaphragm, both valve and valve disk opened at this pressure; said bore means being closed immediately with increasing intake pipe pressure, the pressure in said control pressure chamber and the reference pressure chamber being delayed equalized and said first-mentioned valve being opened by said rod for admitting additional air into the suction pipe till the pressure in said first and second chambers is equalized.

3. The valve arrangement as defined in claim 1 including barometer bellows means; and a disc and rod, said disc being connected to one end of said rod and acting against said second spring means, said rod being actuated by said bellows means, said barometer belows means determining the preload of said second spring means via said disc and rod.

4. The valve arrangement as defined in claim 3 wherein the intake pipe pressure acts against the force of said second spring means and decreases at low air pressure for high altitude, one side of said second diaphragm being subjected to intake pipe pressure via said second line and the other side of said second diaphragm being subjected to atmospheric pressure, the operating point of said valve disc being shifted so that with decreasing atmospheric pressure venting occurs at appropriate lower intake pipe pressure.

* * * * *